United States Patent [19]

Bruce et al.

[11] Patent Number: 5,379,790

[45] Date of Patent: Jan. 10, 1995

[54] VARIABLE RESTRICTION

[75] Inventors: Mark L. Bruce, North Canton, Ohio; Douglas J. Keebler, Irwin, Pa.

[73] Assignee: Suprex Corporation, Pittsburgh, Pa.

[21] Appl. No.: 848,424

[22] Filed: Mar. 6, 1992

Related U.S. Application Data

[63] Continuation-in-part of Ser. No. 828,729, Jan. 31, 1992, Pat. No. 5,316,262.

[51] Int. Cl.$^6$ .................................................. F16K 7/04
[52] U.S. Cl. .............................................. 137/1; 251/4; 138/45; 138/44; 138/46
[58] Field of Search ........................... 251/4, 6, 7, 8, 9; 137/613, 334, 341, 1; 285/341; 138/45, 46, 44

[56] References Cited

U.S. PATENT DOCUMENTS

| | | | |
|---|---|---|---|
| 1,657,663 | 1/1928 | Devereux | 251/4 |
| 2,532,452 | 12/1950 | Hoesel | 285/31 X |
| 2,946,341 | 7/1960 | Sullivan | 137/613 X |
| 3,095,175 | 6/1963 | Iketani | 251/4 |
| 3,180,350 | 4/1965 | Rill, Jr. et al. | |
| 3,429,549 | 2/1969 | Swanson | 251/4 |
| 3,685,786 | 8/1972 | Woodson | 251/4 |
| 4,205,819 | 6/1980 | Soika | 251/9 |
| 4,394,873 | 7/1983 | Switall | 137/613 |
| 4,512,545 | 4/1985 | Mar | 251/4 |
| 4,687,176 | 8/1987 | Olsen | 251/9 |
| 4,776,618 | 10/1988 | Barree | 285/341 |
| 4,811,928 | 3/1989 | Iwatschenko | 251/7 |
| 5,013,006 | 5/1991 | Furuse | 251/8 |

FOREIGN PATENT DOCUMENTS 0384969 9/1990 European Pat. Off. .

OTHER PUBLICATIONS

"Analytical-Scale Supercritical Fluid Extraction" by Steven Hawthorne, *Analytical Chemistry*, vol. 62, No. 11, Jun. 1, 1990.

*Primary Examiner*—Martin P. Schwadron
*Assistant Examiner*—Kevin L. Lee
*Attorney, Agent, or Firm*—Ansel M. Schwartz

[57] ABSTRACT

The present invention pertains to an apparatus for restricting supercritical fluid. The apparatus comprises an elastic tube through which the supercritical fluid flows. The apparatus also comprises means for adjustably compressing the elastic tube. The comprising means is in contact with the tube. Preferably, there is also means for facilitating flow through the tube. The facilitating means is in communication with the tube in proximity to the compressing means. In a preferred embodiment, the adjustable compressing means includes a first member having a first opening through which the tube extends. The first opening has a threaded portion. There is also a second member having a second opening through which the tube extends. The second member has a threaded shaft for threadingly engaging with the threaded portion of the first opening. A compression structure is seated within the first opening in contact with the elastic tube such that as the threaded shaft is screwed within the threaded portion, the compression structure adjustably compresses the tube. Preferably, the first opening has a tapered portion upon which a tapered compression member of the compression structure is seated. In an alternative embodiment, the apparatus includes means to compress a second portion of the tube. If it is desired, the apparatus can be self-adjusting. In this embodiment, there is means for determining the magnitude of supercritical fluid restriction within the elastic tube. The determining means generates a signal. A motor is provided for automatically adjusting the compressing means according to the signal. Preferably, the determining means includes a flow sensor and supercritical fluid identification means. The present invention also pertains to a method of restricting supercritical fluid flow. The method comprises the steps of establishing supercritical fluid flow through an elastic tube, adjustably compressing the elastic tube such that a desired flow rate is maintained therein and applying energy to the supercritical fluid in the tube in proximity to where the tube is compressed. Preferably, there is the step of monitoring the magnitude of supercritical fluid restriction and the compressing step includes the step of automatically adjusting a first compression member against the tube according to the monitored supercritical fluid restriction. Preferably, the energy supplying step includes the step of heating the supercritical fluid in the tube.

37 Claims, 4 Drawing Sheets

VARIABLE RESTRICTION

This is a continuation-in-part application of U.S. Ser. No. 07/828,729 filed on Jan. 31, 1992 (pending) U.S. Pat. No. 5,316,262.

FIELD OF THE INVENTION

The present invention is related in general to fluid restrictors. More specifically, the present invention is related to an adjustable supercritical fluid restrictor especially suited for low flow rate situations.

BACKGROUND OF THE INVENTION

It is known in the art of high pressure fluid or supercritical fluid restrictors to restrict the flow of fluid with fluid restrictors instead of valves because the fluid flow rates, which can be in the range of 0 ml/min. to 10 ml/min., are too low for accurate and reproducible flow control by conventional valves.

In one type of fluid restrictor, holes are formed in a circular disc that are supported in the path of the flowing fluid by the necessary hardware, seals and fittings. A problem exists with such fluid restrictors in that the small size of the hole and its abrupt change in cross sectional area allow it to become clogged easily. This is an undesirable event in that it typically entails dismounting the fluid restrictor so that it can be cleaned or replacing it altogether. A further disadvantage is that the fluid restriction cannot be adjusted without mechanically changing the entire restrictor.

It is also known to use linear fused silica tubing having a small internal channel as a fluid restrictor. Tapered fused silica restrictors are also formed by heating and drawing out the fused silica tubing until the internal channel is the appropriate dimension. (T. L. Chester, D. P. Innis, G. D. Owens, Analytical Chemistry, 57 (1985) 2243-2247).

"Integral" fused silica restrictors (E. J. Guthrie, H. E. Schwartz, J. Chromatographic Science, 24 (1986) 236-241) are formed by heating the end of the fused silica tubing until it melts shut. Then, the end is filed or sanded until a small hole is formed. Ceramic or alumina frits have also been formed at the ends of the fused silica restrictor (K. E. Morkides, S. M. Fields, M. L. Lee, J. Chromatographic Science, 24 (1986) 254-257 and U.S. Pat. No. 4,793,920). A review of restrictors is given by B. W. Wright, R. D. Smith, "Restrictor Performance Characteristics for SFC", Chapter 10 of Book Modern Supercritical Fluid Chromatography, Ed C. M. White, Dr. Alfred Huthig Verlag, ISBN 3-7785-1569-1, 1988.

A length of fused silica tubing does better as a restrictor than a hole in a disc as it plugs less often because the internal diameter can be larger, but it is limited by other deficiencies including 1) it is brittle and can break easily, 2) a long length must be used, typically 10 to 100 centimeters which makes its use inconvenient to the user, and 3) they are difficult to heat. Such restrictors also are lacking in that they cannot be adjusted. Similarly, U.S. Pat. No. 4,776,618 shows a high pressure coupling which is not adjustable.

European Patent No. 89121728.3 discloses another type of fluid restrictor which is based on a valve which is disposed within the fluid flow to constrict it. As an aside, although not directed to the art of supercritical fluid restriction, there is U.S. Pat. No. 2,532,452 which discloses an essentially adjustable tubular fluid flow restrictor for refrigeration systems.

Accordingly, there is a need to overcome plugging due to particles collecting in the restrictor area, and to compensate for changes in viscosity due to changes in the composition of the fluid such as the addition of water, modifiers, etc. and to provide means so that fluid flow can be easily adjusted to desired values.

The present invention provides an adjustable supercritical fluid restrictor wherein an elastic tube is adjustably compressed such that the channel within is restricted a desired amount.

SUMMARY OF THE INVENTION

The present invention pertains to an apparatus for restricting supercritical fluid. The apparatus comprises an elastic tube through which the supercritical fluid flows. The apparatus also comprises means for adjustably compressing the elastic tube. The compressing means is in separable and releasable contact with the tube so the tube can be removed from the compressing means and replaced without damage to the compressing means. The supercritical fluid is at a pressure of at least 100 atm on one side of the compressing means. Preferably, there is also means for facilitating flow through the tube. The facilitating means is in communication with the tube in proximity to the compressing means.

In a preferred embodiment, the adjustable compressing means includes a first member having a first opening through which the tube extends. The first opening has a threaded portion. There is also a second member having a second opening through which the tube extends. The second member has a threaded shaft for threadingly engaging with the threaded portion of the first opening. A compression structure is seated within the first opening in contact with the elastic tube such that as the threaded shaft is screwed within the threaded portion, the compression structure adjustably compresses the tube. Preferably, the first opening has a tapered portion upon which a tapered compression member of the compression structure is seated. In an alternative embodiment, the apparatus includes means to compress a second portion of the tube.

If it is desired, the apparatus can be self-adjusting. In this embodiment, there is means for determining the magnitude of supercritical fluid restriction within the elastic tube. This determination can be based upon either flow control or pressure control of the supercritical fluid or liquid. The determining means generates a signal corresponding thereto, and is in communication with the interior of the tube. A motor is provided for automatically adjusting the compressing means according to the signal. For instance, the motor can be a worm gear that turns the second member within the first member. Preferably, the determining means includes a flow sensor or pressure sensor.

The present invention is also a method of restricting supercritical fluid flow. The method comprises the steps of establishing supercritical fluid flow through an elastic tube and adjustably compressing the elastic tube such that a desired flow rate is maintained therein. Preferably, there is the step of applying energy to the supercritical fluid in the tube in proximity to where the tube is compressed. Preferably, there is the step of monitoring the magnitude of supercritical fluid restriction, and the compressing step includes the step of automatically adjusting a first compression member against the tube according to the monitored supercritical fluid restriction. Preferably, the energy supplying step includes the step of heating the supercritical fluid in the tube.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
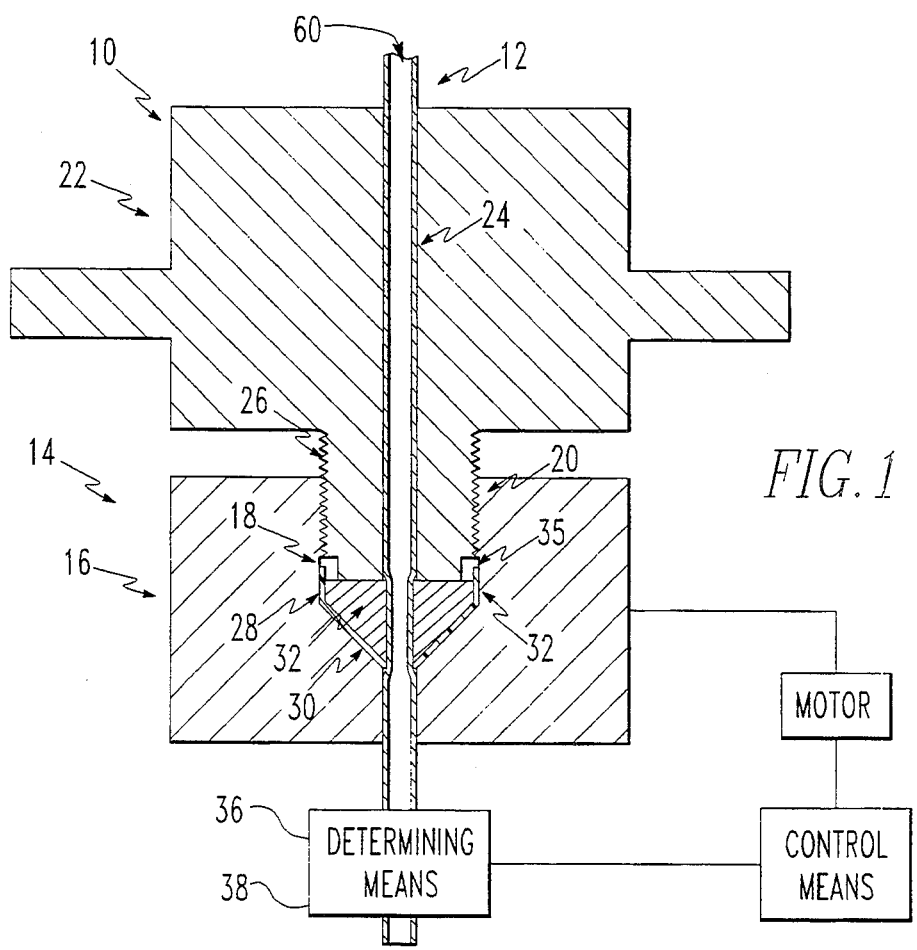
FIG. 1 is a schematic representation showing a first embodiment of the variable restrictor.

Referring now to the drawings wherein like reference numerals refer to similar or identical parts throughout the several views, and more specifically to FIG. 1 thereof, there is shown an apparatus 10 for restricting supercritical fluid. The apparatus 10 comprises an elastic tube 12 through which the supercritical fluid flows. There is also means 14 for adjustably compressing the elastic tube 12. The compressing means is in separable and releasable contact with the tube so the tube can be removed from the compressing means and replaced without damage to the compressing means. The supercritical fluid is at a pressure of at least 100 atm on one side of the compressing means. Preferably, there is means for facilitating flow through the tube. The facilitating means is in communication with the tube in proximity to the compressing means.

Figure 2:
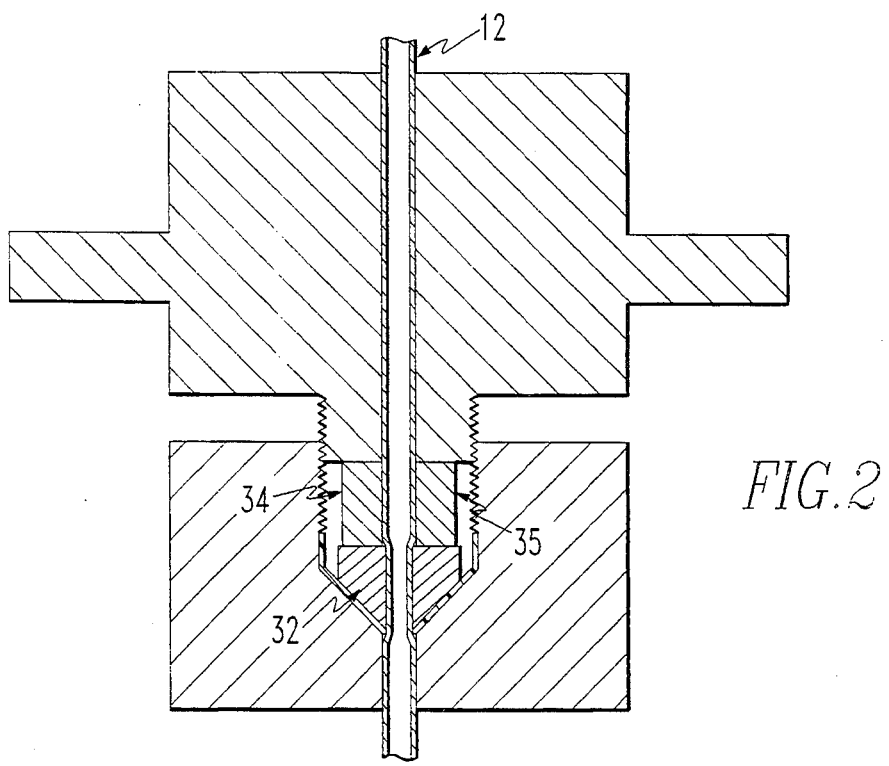
FIG. 2 is a schematic representation showing the compression structure.

In a preferred embodiment, the adjustable compressing means 14 includes a first member 16 having a first opening 18 through which the tube 12 extends. The first opening 18 preferably has a threaded portion 20. There is also a second member 22 having a second opening 24 through which the tube 12 extends. The second member 22 preferably has a threaded shaft 26 for threadingly engaging with the threaded portion 20 of the first opening 18. A compression structure 28 is seated within the first opening 18 in contact with the elastic tube 12 such that as the threaded shaft 26 is screwed within the threaded portion 18, the compression structure 28 adjustably compresses the tube 12. Preferably, the first opening 18 has a tapered portion 30 upon which a tapered compression member 32 of the compression structure 28 is seated. As shown in FIG. 2, the compression structure 28 can have a spacer 34 for use when commercially available parts do not provide sufficient thread length. Alternatively, the spacer 34 can be used to fill the space 35 as the compression structure 28 compresses the tube 12. The adjustable compressing means 14 can also be a pneumatically or hydraulically controlled clamp, such as a pneumatic drill chuck.

Figure 6:
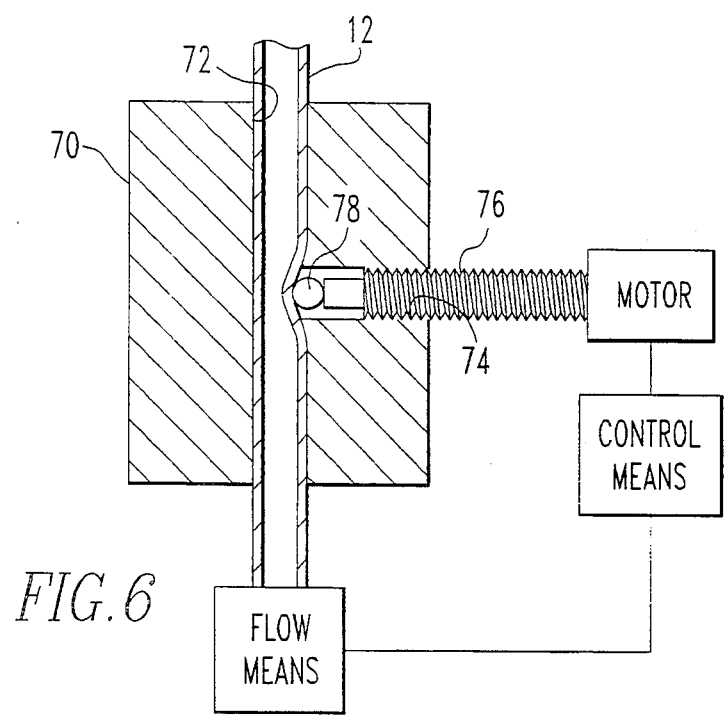
FIG. 6 is a schematic representation showing an alternative embodiment of the variable restrictor.

In an alternative embodiment, and as shown in FIG. 6, the adjustable compressing means 14 includes a body member 70 having a first hole 72 through which the tube 12 extends and a threaded hole 74, in communication with and essentially perpendicular to the first hole, through which a threaded compression shaft 76 extends. The threaded shaft 76 can adjustably compress a ball bearing 78 into the tube 12. Alternatively, the threaded shaft can have a shaped end for compressing the tube 12. Preferably, a flow sensor or pressure sensor is provided for determining the level of supercritical fluid restriction. The flow sensor is preferably in communication with a motor through control means so that the apparatus 10 can automatically adjust itself corresponding to the supercritical fluid flow.

The elasticity of the tube 12 allows it to expand when the compression means 14 is loosened. In practice, a tube comprised of poly ether ether ketone (PEEK), as well as PTFE or stainless steel, to name but a few of the possible elastic materials, exhibits the necessary properties of elasticity and durability. It should be noted that in very high pressure applications, PEEK tubing works best. With respect to PEEK, a torque of at least 60 in.-lbs. thereon will cause the PEEK tube to experience compression.

If it is desired, the apparatus 10 can be self-adjusting. In this embodiment, there is means 36 for determining the magnitude of supercritical fluid restriction within the elastic tube 12. The determining means 36 can operate by sensing pressure with a pressure sensor upstream of the restrictor and then controlling the compression on the restrictor to adjust the upstream pressure or by sensing flow with a flow sensor either upstream of the restrictor or downstream of the restrictor and then adjusting the restrictor to a set flow rate. The pressure sensor can be a transducer disposed in the dead leg of a "T" positioned upstream of the restrictor. If a flow sensor is utilized, then on the inlet side of the restrictor, a liquid flow sensor such as a Brooks in-line flow sensor can be utilized; or, on the outlet side, a gas flow meter can be used.

The determining means generates a signal corresponding to the flow, the pressure or both in the tube 12. A motor is provided for automatically adjusting the compressing means according to the signal. For instance, the motor can be a worm gear that turns the first member 16 within the second member 22. Preferably, the facilitating means includes heating means such as a heating coil which is positioned adjacent to the first member 16 in any preferred manner such that heat produced by the heating coil heats the tube 12 and the fluid within. Heating the tube 12 in proximity to the restrictor reduces clogging in the tube 12. Alternatively, the facilitating means can include means for producing vibrations, means for producing microwaves or, means for producing ultrasound, separately or in combination with heat. Alternatively, microwaves can be used to heat the tubing 12. Essentially, the facilitating means introduces energy to the supercritical fluid in the tube 12 in proximity to the restrictor to prevent clogging thereof. The microwave producing means and the ultrasound producing means are positioned adjacent to the tube 12 in any desired manner such that their respective produced energy interacts with the fluid in tube 12 to reduce clogging. The vibration producing means can be positioned in contact with the first member 16 such that the first member 16 is vibrated which in turn vibrates the tube 24 and the fluid within.

Figure 3:
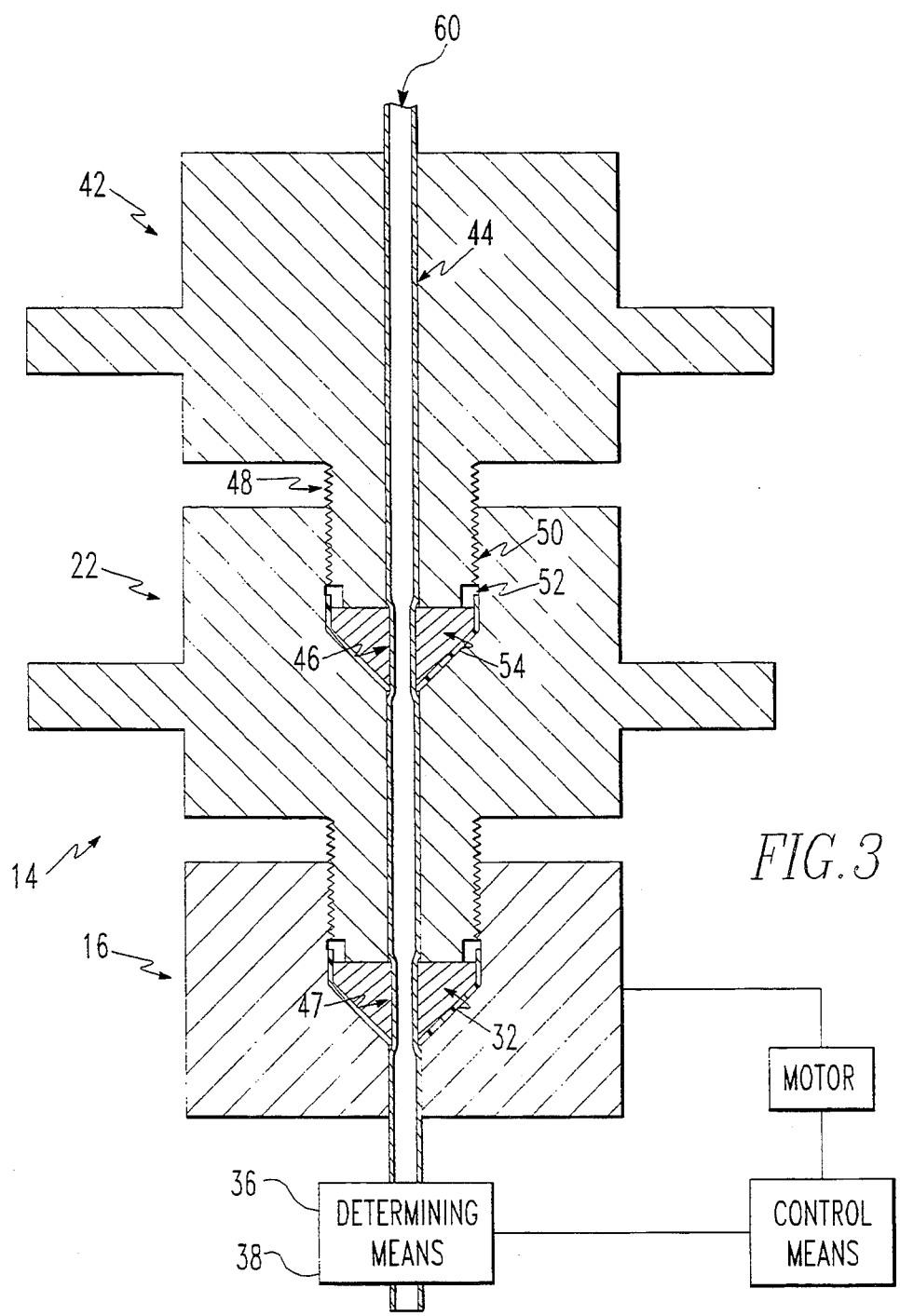
FIG. 3 is a schematic representation showing a second embodiment of the variable restrictor.

In an alternative embodiment and as shown in FIG. 3, there is a third member 42 having a third opening 44 through which the tube 12 extends for compressing a second portion 46 of the tube 12. Preferably, the third member 42 has a second threaded shaft 48 for engaging with a second threaded portion 50 of a second opening 52 disposed within the second member 16. The second shaft 48 is forced against a second compression structure 54 disposed within the second opening 52, compressing the second portion 46 of the elastic tube 12.

The second compression structure 54 is used as a clamp to hold the tube 12 while the first compression structure 32 is used as an adjustable supercritical fluid restrictor. In this way, the second compression structure 54 should not become loose, allowing the tube 12 to come out of the first member 16 due to the high pressures present during operation. Loosening or tightening should only occur with respect to the first compression structure 32 to provide the desired adjustment of the flow in the tube 12.

The present invention is also a method of restricting supercritical fluid flow. The method comprises the steps of establishing supercritical fluid flow through an elastic tube and adjustably compressing the elastic tube such that a desired flow rate is maintained therein. Preferably, there is the step of applying energy to the supercritical fluid in the tube in proximity to where the tube is compressed. Preferably, the applying energy step includes the step of heating the supercritical fluid within the tube in proximity to the compression means. Preferably, there is the step of monitoring the magnitude of supercritical fluid restriction through flow or pressure parameters and the compressing step includes the step of automatically adjusting a first compression member against the tube according to the monitored supercritical fluid restriction. Preferably, the compression step includes the steps of screwing a threaded shaft within a threaded opening such that a compression member adjustably compresses the elastic tube.

In order to provide increased adjustment range, the screwing step can include the steps of screwing the threaded shaft into the threaded opening such that the tube is compressed a first amount and unscrewing the threaded from the threaded opening. Then, there are the steps of placing a spacer in contact with the compression member and screwing the threaded shaft into the threaded opening such that the compression member compresses the elastic tube a second amount. In this manner, a threaded shaft having insufficient thread length to fully compress its compression member can be essentially lengthened by the addition of a spacer to compress the compression member to the desired degree.

Figure 4:
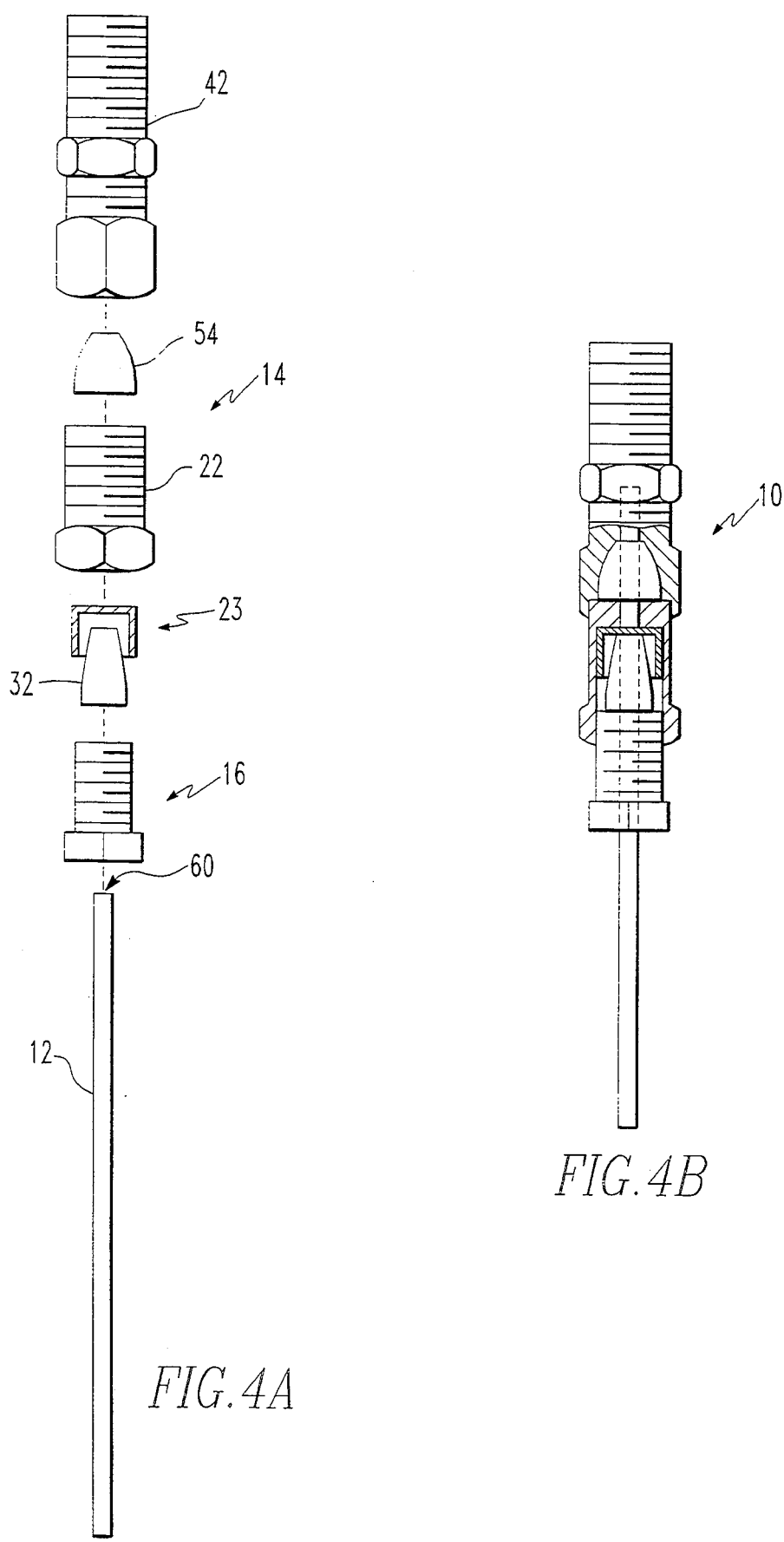
FIGS. 4a and 4b are schematic representations showing a preferred embodiment of the variable restrictor.
Figure 5:
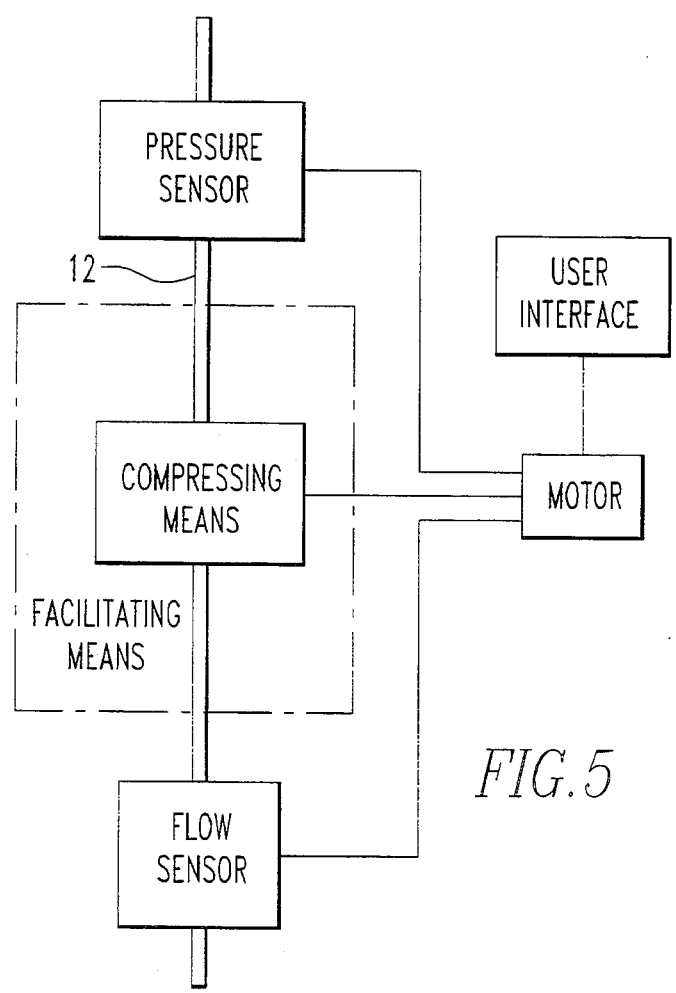
FIG. 5 is a block diagram of the variable restrictor.

In the operation of the invention, and as shown in FIGS. 4a and 4b, an elastic tube 12 comprised of PEEK is inserted into the compressing means 14. The tube 12 has an outside diameter of 1/16 of an inch and a length of 6 cm. The channel 60 within the tube 12 originally has a uniform diameter of 0.007 inches. The PEEK tubing is coupled to input and output tubes with 1/16 valve fittings (not shown).

The first member 16 is a Valco 1/6 nut CAT #ZN1. The second member 22 is a Valco internal reducer ⅛×1/16 CAT #12R21 which comes with a stainless steel ferrule seat 23. During compression, space 35 will be filled by the deformed ferrule seat 23. The third member 42 is a Valco ⅛×1/16 bulkhead reducing union CAT #2BRUZ.5T. The second compression member 54 is an Alltech ferrule ⅛×1/16 CAT #RF-200/100-V(j31) and is essentially used to clamp the PEEK tube 22. Alternatively, the second compression member 54 can be a graphite/vespel ferrule. The first compression member 32 is an Upchurch PEEK ferrule CAT #F-142 and is used to adjustably compress the PEEK tube 12 and is situated within the ferrule seat 23. Some of these parts are modified before they are used to insure proper fit and operation.

As shown in FIG. 3, the tube 12 is then placed in fluidic connection with a source of $CO_2$ supercritical fluid and a heating coil disposed about the tube 12 is turned on. The supercritical fluid flows through the tube where the level of supercritical fluid restriction is monitored by flow sensor 38. The desired restriction is entered into a computer which serves as the control means. The signals from the flow sensor 38 communicate with the computer which compares the measured flow restriction with the desired flow restriction and controls the motor accordingly, The motor mechanically turns the first member 16 such that the first compression structure 32 adjustably compresses against the first portion 47 of the elastic tube 12. During the operation of the supercritical fluid restriction apparatus, the sensor 38, the control means and the motor act as a feedback control system which automatically control the compression of the first portion 47.

Typical supercritical fluid restriction levels cause the pressure within the channel to drop from 100–680 atmospheres upstream of the restrictor 10 to a pressure of 1 atmosphere downstream of the restrictor 10 at a flow rate of 0.1 to 10 ml/min. The width of the channel necessary for this level of supercritical fluid restriction is on the order of 0.01 mm.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for restricting supercritical fluid comprising:
    an elastic tube through which the supercritical fluid flows, said elastic tube comprised of material designed to support supercritical fluid at a pressure of at least 100 atm; and
    means or a mechanism for adjustably compressing and releasing the elastic tube such that the supercritical fluid at a pressure of at least 100 atm in the elastic tube is restricted a desired amount, said compressing means or mechanism in separable and releasable contact with the tube so the tube can be removed from the compressing means or mechanism and replaced without damage to the compressing means or mechanism, said supercritical fluid at a pressure of at least 100 atm on one side of the compressing means.

2. An apparatus as described in claim 1 including means for providing energy to the fluid within the tube to reduce clogging of the fluid in the tube, said providing means disposed adjacent to the tube such that energy provided thereby interacts with the fluid to reduce clogging in the tube.

3. An apparatus as described in claim 2 wherein the compressing means includes:
    a first member having a first opening through which the tube extends, said first opening having a threaded portion;
    a second member having a second opening through which the tube extends and a threaded shaft for engaging with the threaded portion of the first opening;
    a compression structure seated within the first opening in contact with the tube such that as the threaded shaft is screwed within the threaded portion, the compression structure adjustably compresses the tube.

4. An apparatus as described in claim 1 wherein the compressing means includes an electrical, hydraulic or pneumatic powered clamp.

5. An apparatus as described in claim 3 wherein the compression structure includes a compression member and the first opening has a tapered portion upon which the compression member is seated, said compression member having a tapered profile and a compression opening for housing the tube.

6. An apparatus as described in claim 5 wherein the elastic tubing is comprised of poly ether ether ketone, PTFE or stainless steel.

7. An apparatus as described in claim 6 including means for determining the magnitude of supercritical fluid restriction within the elastic tube and generating a signal corresponding thereto, said determining means in communication with the interior of the tube, a motor for mechanically adjusting the compressing means in contact therewith and control means for automatically controlling the motor according to said signal, said control means in communication with said motor and said determining means.

8. An apparatus as described in claim 7 wherein the controlling means includes a computer.

9. An apparatus as described in claim 8 wherein the providing means includes means for producing heat, means for producing microwaves, means for producing vibration, or means for producing ultrasound.

10. An apparatus as described in claim 9 wherein the determining means includes a flow sensor in communication with the tube and the computer.

11. An apparatus as described in claim 9 wherein the determining means includes a pressure sensor in communication with the tube and the controlling means.

12. An apparatus as described in claim 9 wherein the determining means includes a flow sensor and a pressure sensor in communication with the tube and the computer.

13. An apparatus as described in claim 2 wherein the compressing means includes means for compressing a first portion of the tube and means for adjustably compressing a second portion of the tube.

14. An apparatus as described in claim 13 wherein the compressing means includes:

a first member having a first opening through which the tube extends, said first opening having a first threaded portion;

a second member having a second opening through which the tube extends and a first threaded shaft for engaging with the first threaded portion of the first opening, said second opening having a second threaded portion;

a first compression structure seated within the first opening in contact with the first portion of the tube such that as the threaded shaft is screwed into the first threaded portion, the compression structure compresses the first portion of the tube;

a third member having a third opening through which the tube extends and a second threaded shaft for engaging with the second threaded portion of the second opening; and a second compression structure having a second compression opening in contact with the second portion of the tube such that as the second threaded shaft is screwed into the second threaded portion, the second compression structure compresses the second portion of the tube.

15. An apparatus as described in claim 14 wherein the first and second openings have tapered portions and the first and second compression structures each have a compression member having a tapered profile for seating within the respective tapered portion.

16. An apparatus as described in claim 15 wherein the elastic tubing is comprised of poly ether ether ketone, PTFE or stainless steel.

17. An apparatus as described in claim 16 including means for determining the magnitude of supercritical fluid restriction within the elastic tube and generating a signal corresponding thereto, said determining means in communication with the interior of the tube, a motor for mechanically adjusting the third member in contact therewith and control means for automatically controlling the motor according to said signal, said control means in communication with said motor and said determining means.

18. An apparatus as described in claim 17 wherein the providing means includes means for producing heat, means for producing vibration, means for producing microwaves, or means for producing ultrasound.

19. An apparatus for restricting supercritical fluid comprising:

an elastic tube through which the supercritical fluid flows;

means for adjustably compressing the elastic tube, said compressing means in contact with the tube; and means for determining the magnitude of supercritical fluid restriction within the elastic tube and generating a signal corresponding thereto, said determining means in communication with the interior of the tube, a motor for mechanically adjusting the compressing means in contact therewith and control means for automatically controlling the motor according to said signal, said control means in communication with said motor and said determining means.

20. An apparatus as described in claim 19 including means for providing energy to the fluid within the tube to reduce clogging in the tube, said providing means disposed adjacent to the tube such that energy provided thereby interacts with the fluid to reduce clogging in the tube.

21. An apparatus as described in claim 20 wherein the controlling means includes a computer.

22. An apparatus as described in claim 21 wherein the determining means includes a flow sensor in communication with the tube and the computer.

23. An apparatus as described in claim 21 wherein the determining means includes a pressure sensor in communication with the tube and the computer.

24. An apparatus as described in claim 21 wherein the determining means includes a flow sensor and a pressure sensor in communication with the tube and the computer.

25. An apparatus for restricting supercritical fluid comprising:

an elastic tube through which the supercritical fluid flows; and means for adjustably compressing the elastic tube, said compressing means in contact with the tube, said compressing means including means for compressing a first portion of the tube and means for adjustably compressing a second portion of the tube, said compressing means including a first member having a first opening through which the tube extends, said first opening having a first threaded portion; a second member having a second opening through which the tube extends and a first threaded shaft for engaging with the first threaded portion of the first opening, said second opening having a second threaded portion; a first compression structure seated within the first opening in contact with the first portion of the tube such that as the threaded shaft is screwed into the first threaded portion, the compression structure compresses the first portion of the tube; a third member having a third opening through which the tube extends and a second threaded shaft for engaging with the second threaded portion of the second opening; and a second compression structure having a second compression opening in contact with the second portion of the tube such that as the second threaded shaft is screwed into the second threaded portion, the second compression structure compresses the second portion of the tube.

26. An apparatus as described in claim 25 wherein the first and second openings have tapered portions and the first and second compression structures each have a compression member having a tapered profile for seating within the respective tapered portion.

27. An apparatus for restricting supercritical fluid comprising:
   an elastic tube through which the supercritical fluid flows;
   means for adjustably compressing the elastic tube, said compressing means in contact with the tube; and
   means for providing energy to the fluid within the tube to reduce clogging of the fluid in the tube, said providing means disposed adjacent to the tube such that energy provided thereby interacts with the fluid to reduce clogging in the tube.

28. An apparatus as described in claim 27 wherein the providing means includes means for producing heat, means for producing microwaves, means for producing vibration, or means for producing ultrasound.

29. An apparatus for restricting supercritical fluid comprising:
   an elastic tube through which the supercritical fluid flows; and
   means or a mechanism for adjustably compressing and releasing the elastic tube, said compressing means in separable and releasable contact with the tube so the tube can be removed from the compressing means and replaced without damage to the compressing means, said supercritical fluid at a pressure of at least 100 atm on one side of the compressing means, said compressing means including a first member having a first opening through which the tube extends, said first opening having a threaded portion, said compressing means including a second member having a second opening through which the tube extends and a threaded shaft for engaging with the threaded portion of the first opening, said compressing means including a compression structure seated within the first opening in contact with the tube such that as the threaded shaft is screwed within the threaded portion, the compression structure adjustably compresses the tube.

30. A method or restricting the flow of supercritical fluid comprising the steps of:
   establishing supercritical fluid flow through an elastic tube;
   adjustably compressing and releasing the elastic tube such that a desired flow rate is maintained therethrough; and
   applying energy to the supercritical fluid in the tube in proximity to where the tube is compressed.

31. A method as described in claim 30 including the step of monitoring the magnitude of supercritical fluid restriction and the compressing step includes the step of automatically adjusting a first compression member against the tube according to the monitored supercritical fluid restriction.

32. A method as described in claim 31 wherein the adjustable compressing step includes the steps of screwing a threaded shaft within a threaded opening such that a compression member adjustably compresses the elastic tube.

33. A method as described in claim 32 wherein the screwing step includes the steps of screwing the threaded shaft into the threaded opening such that the tube is compressed a first amount, unscrewing the threaded shaft from the threaded opening, placing a spacer in contact with the compression member and screwing the threaded shaft into the threaded opening such that the compression member compresses the elastic tube a second amount.

34. A method as described in claim 33 wherein the adjustable compression step includes the steps of adjustably forcing a first compression member against a first portion of the tube and adjustably forcing a second compression member against a second portion of the tube.

35. A method as described in claim 34 wherein the energy applying step includes the step of heating the supercritical fluid in the tube in proximity to where the tube is compressed.

36. A method of restricting the flow of supercritical fluid comprising the steps of:
   establishing supercritical fluid flow through an elastic tube;
   adjustably compressing the elastic tube such that a desired flow rate is maintained therethrough;
   monitoring the magnitude of supercritical fluid restriction with a sensor; and
   automatically adjusting a first compression member against the tube to compress the tube with a motor according to the monitored supercritical fluid restriction.

37. A method as described in claim 36 wherein after the adjusting step, there is the step of applying energy to the fluid in the tube in proximity to where the tube is compressed.

* * * * *